H. T. FARNSWORTH.
Governors.
No. 199,149. Patented Jan. 15, 1878.
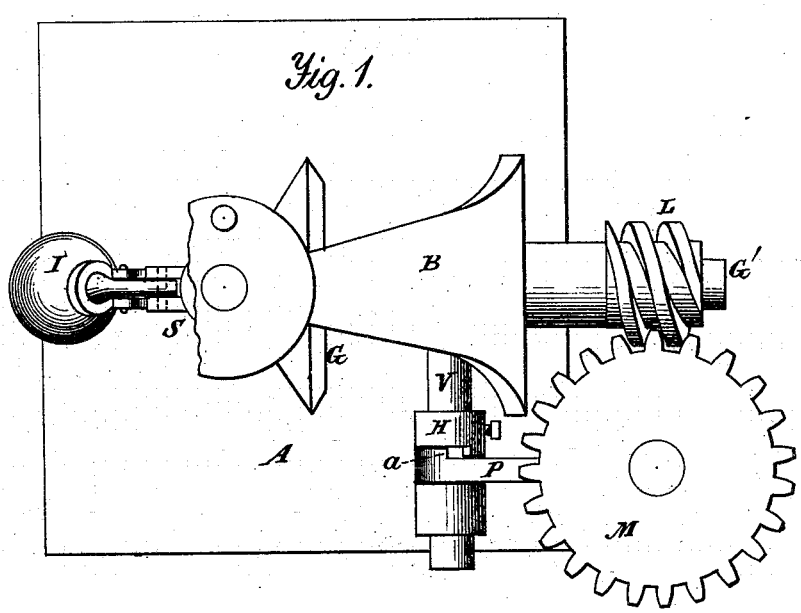
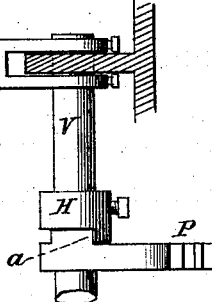
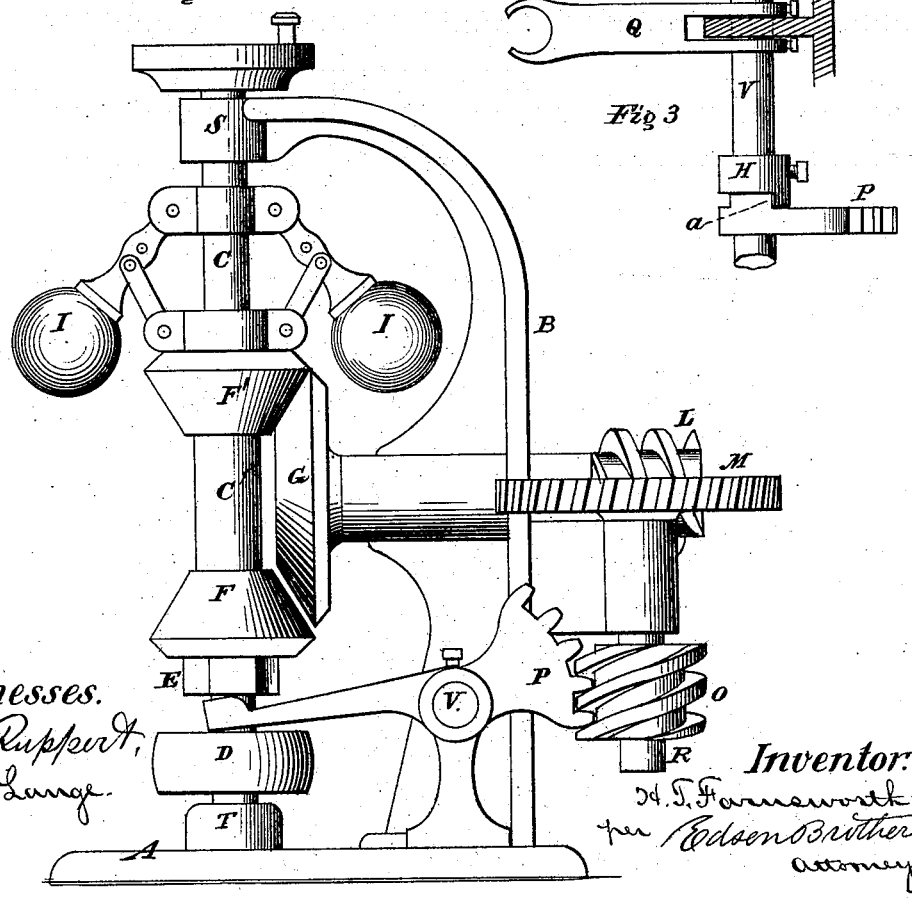
Witnesses.
A. Ruppert,
Jas. H. Lange.
Inventor:
H. T. Farnsworth
per Edson Brothers
Attorney

# UNITED STATES PATENT OFFICE.

HENRY T. FARNSWORTH, OF BELLEFONTE, PENNSYLVANIA.

IMPROVEMENT IN GOVERNORS.

Specification forming part of Letters Patent No. 199,149, dated January 15, 1878; application filed December 3, 1877.

*To all whom it may concern:*

Be it known that I, HENRY T. FARNSWORTH, of Bellefonte, in the county of Center and State of Pennsylvania, have invented certain new and useful Improvements in Water-Wheel and Steam Governors; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a plan view, partly broken away, of my improved governor. Fig. 2 is a side elevation of the same, and Fig. 3 is a detail view.

Corresponding parts in the several figures are denoted by like letters.

This invention appertains to a certain improvement in engine-governors particularly adapted for opening and closing the gates of water-wheels; and it consists of mechanism interposed between the governor shaft sleeve and the valve or water-wheel gate opening and closing shaft, for holding the flanges or wheels of said sleeve intact with their engaging wheel, or lifting the lower one of said flanges in contact with said wheel in reversing the motion of the governor, substantially as hereinafter more particularly set forth.

In the annexed drawing, A refers to a base or foundation, upon which the governor frame or support is secured. C is the governor-shaft, driven by a pulley, D, thereon and a belt connected to the water-wheel or engine-shaft. The shaft C bears in the step T and top piece S, fastened to an arm of the upright or frame B. Upon the shaft C is a sleeve, C', having beveled flanges or wheels F F', and connected to the arms of the balls or weights I I in the usual way, which sleeve is susceptible of vertical movement in order to admit of its wheels or flanges F F' being alternately brought into contact with a wheel, G, upon a shaft, G', bearing in the upright or frame B. Upon the other end of the shaft G is a worm or screw, L, gearing with a pinion, M, upon an upright shaft, R, bearing in an arm of the upright B, and extended down and connected to the valve-stem of an engine or gate of a water-wheel. The shaft R is also provided with a worm or screw, O, with which engage a toothed sector, P, upon a shaft, V, bearing in the support or frame B, and an upright secured to base A.

The toothed sector P is provided with a projection or lug, *a*, which engages a stop, H, upon the shaft V, to rotate said shaft. This shaft is provided with a lever or arm, Q, which extends beneath the lower end or flange of the sleeve E.

The operation is as follows: Motion being imparted to the shaft C, its balls I I will rotate the sleeve C' and its flanges or wheels F F', causing the upper one to drive the wheel G and shaft G', transmitting motion to its worm L, which drives the pinion M, the said pinion depressing the toothed sector P. Simultaneously with this movement of parts the engine-valve or water-wheel gate, to whichever it may be connected, will be opened, causing a flow of steam or water, as the case may be. As the flow continues and the toothed sector P descends, its projection or lug *a* will strike the stop H upon the shaft V, and rotate the said shaft until its lever or arm Q frees the upper flange F' from the wheel G, and holds both it and the flange F intact with the said wheel, to produce a uniform flow or supply of water or steam, as the case may be. The lower flange F is lifted, when a heavy flow of water or steam is on, by the increased speed of the balls I I, into contact with the wheel G, and there held sufficiently long to reverse the motion of said wheel.

I do not limit myself to the particular construction of parts herein shown, as it is obvious that in lieu of the stop H a pin or stud may be used, and instead of the projection *a* upon the toothed sector P a groove may be formed in the ring of the eye, by which it grasps the shaft V, to receive the pin on said shaft, without departing from the spirit of my invention.

Having thus described my invention, what I claim, and desire to secure by Letters Patent, is—

1. In an engine-governor, a shaft having an arm or lever, a stop, and a toothed sector having a projection interposed between its sleeve and the valve or water-wheel gate opening and closing mechanism, substantially as and for the purpose set forth.

2. The combination, with the sleeve C', having flanges F F', of the wheel G, shaft G', worm L, shaft R, pinion M, worm O, toothed sector P, having projection $a$, and shaft V, having a stop, H, and arm or lever Q, substantially as and for the purpose set forth.

In testimony that I claim the foregoing as my own I hereunto affix my signature in presence of two witnesses.

HENRY T. FARNSWORTH.

Witnesses:
 JOHN G. PARKS,
 EMANUEL KLEPDER.